Oct. 9, 1951 J. C. O'BRIEN 2,570,840
RADIO-FREQUENCY OSCILLATOR ORGANIZATION
Filed Nov. 23, 1946
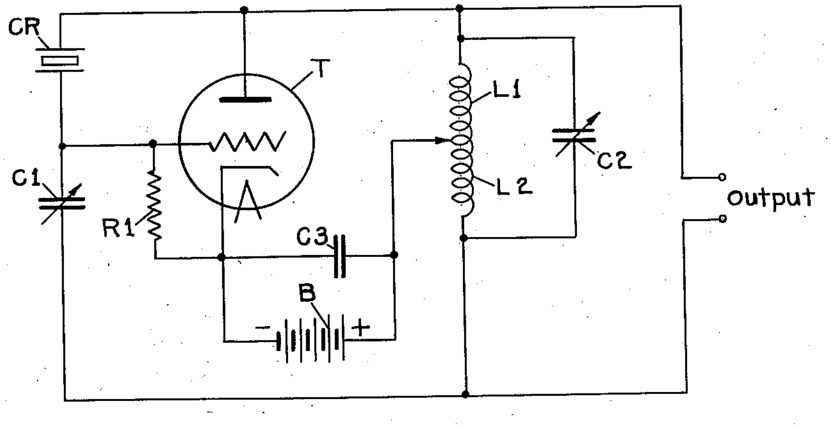
INVENTOR.
J. C. O'Brien,
BY Neil W. Preston,
HIS ATTORNEY.

Patented Oct. 9, 1951 2,570,840

UNITED STATES PATENT OFFICE 2,570,840

RADIO-FREQUENCY OSCILLATOR ORGANIZATION

John C. O'Brien, Rochester, N. Y., assignor to General Railway Signal Company, Rochester, N. Y.

Application November 23, 1946, Serial No. 711,998

1 Claim. (Cl. 250—36)

This invention relates to oscillators for radio communication systems, and more particularly pertains to an oscillator for frequency control devices which will be unusually active in spite of the sluggishness of the control devices.

It is well known in the art that an electron tube may be used as an oscillator under the control of a mechanically tuned device such as a piezoelectric crystal, a magnetostrictive device and the like. Such control of an oscillator tube is relatively effective for the production of frequencies at the fundamental frequency of the control device within certain ranges. However, when a crystal, for example, is to be employed in its harmonic mode, or at a very low fundamental frequency, it becomes sluggish or relatively inactive, and unless the feed back energy supplied to the crystal is of substantial value, the oscillator organization is subject to unexpected cessations of operation. On the other hand, if a sufficiently strong feedback is employed to cause the desired activity of the crystal in the oscillator organization, it may happen that the oscillator organization will operate at a frequency characteristic of the circuit and independently of the crystal, or other control device.

Thus, it may be said that one object of the present invention is to provide an oscillator organization for producing frequencies in the harmonic or fundamental frequency ranges of a control device, such as a crystal, or the like, which organization will provide sufficient feedback for the control device as to render it unusually active while at the same time being protected against undesired frequency oscillations different from the desired frequency of the control device employed.

Another object of the invention is to provide an oscillator organization which is adapted to cause unusually active oscillation at the selected frequency of the frequency spectrum of the control device regardless of whether such selected frequency is in the fundamental or harmonic mode of the device.

A further object of the present invention may be said to reside in the provision of a circuit organization which will provide feedback energy in such a way as to be cumulative with respect to the control grid of the oscillator tube to sustain oscillation of the organization in spite of the sluggishness in the mechanical vibration of the control device, but which will cause neutralization of the feedback energy with respect to the control grid of the oscillator tube for frequencies other than the selected frequency of the control device.

Generally speaking, and without attempting to define the exact nature and scope of the invention, it is proposed to accomplish the above purposes by the provision of an oscillator organization having two feedback circuits connected in a bridge type arrangement such that the feedback energy in one circuit is cumulative with respect to the feedback energy in the other circuit so long as the control device in said one circuit oscillates at the selected frequency but such that the feedback energy in said one circuit acts to neutralize the feedback energy in the said other circuit when the control device is not oscillating at the selected frequency.

Other objects, purposes and characteristic features of the present invention will be in part obvious from the accompanying drawings, or in part pointed out as the description of the invention progresses.

In describing the invention in detail, reference will be made to the accompanying drawing which shows in a diagrammatic and conventional manner one organization of a crystal controlled oscillator for producing radio frequencies at a selected harmonic or fundamental frequency of vibration of the piezoelectric crystal.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice.

With reference to the single figure of the drawing, it will be noted that a triode electron tube T is provided with a heater type cathode. The control of the heating element has not been shown, it being understood that this can take any conventional form. Associated with the plate or anode of this tube T is a suitable winding having two parts designated L1 and L2, but actually this is a single air core winding having a mid tap connected to the positive terminal of a suitable plate supply such as the battery B. The negative side of the battery B is connected to the cathode of the tube T, but this battery is actually shunted insofar as radio frequencies are concerned by the bypass condenser C3.

The winding L1—L2 is shunted by a variable condenser C2 to form a tuned tank circuit for the plate and grid of the tube. The upper end of the coil or winding L1—L2 is connected to the plate or anode of the tube T and also through the crystal CR to the control grid; while the other terminal of the winding L1—L2 is connected through the variable condenser C1 to the control grid of the tube T.

The resistor R1 is connected between the control grid and the cathode to act as a grid leak and thereby provide a suitable bias potential for the control grid when oscillations are established.

The crystal CR is of the piezoelectric type of a suitable cut and with a suitable mounting so that the crystal can readily vibrate at its particular mode selected for the oscillator organization. Let us assume that the crystal CR is to be operated at its harmonic mode, for example. Such harmonic mode crystals are provided since it is necessary in ultra-high frequency organizations to obtain frequencies considerably greater than can be obtained by the operation of a crystal at its fundamental or base frequency. This is because it is not mechanically feasible to provide crystals for fundamental operation much above 15,000 kilocycles. Thus, it is proposed that the crystal CR be selected to operate on its third, fifth or seventh harmonic corresponding to the frequency at which the tank circuit of the organization is resonated.

Referring to the drawing, it will be noted that a bridge type connection is provided with the portions L1 and L2 of the winding acting as two legs of the bridge, and the crystal CR and condenser C1 acting as the opposite two legs of the bridge. To balance this bridge connection, the variable condenser C2 is set so that the tank circuit will not be resonated at the desired frequency of oscillation for the organization. The variable condenser C1 is then adjusted to balance the bridge in accordance with the capacitive effect of the crystal CR.

It is well understood that a crystal CR has an equivalent circuit characteristic corresponding to an inductance, capacitance and resistor in series and connected in multiple with a capacitor so that the organization when operating at its characteristic frequency, such as its fundamental, or a characteristic harmonic frequency in effect is the same as a resonated tank circuit with a relatively high equivalent Q. The equivalent Q of a crystal resonator is dependent upon the type of mounting and structure, but usually provides a very high Q and in some cases is in the order of several thousand. However, at non-resonated frequencies, i. e. at frequencies different than its fundamental or harmonic mode frequencies, the crystal acts in effect merely as a condenser. Thus, under the conditions being considered, this capacitive effect of the crystal CR is balanced by the condenser C1. Under such balanced condition of the impedances in the bridge type connections, the organization will not oscillate.

After the bridge connections have been balanced, the variable condenser C2 is adjusted to resonate the winding having portions L1 and L2 at a frequency corresponding to the selected harmonic of the crystal CR. The lower terminal of portion L2 provides feedback energy from the plate circuit to the control grid 180° out of phase with the radio frequency potential applied to the plate, which provides the inherent tendency of the organization to oscillate. Also, the crystal CR acts, at the resonated frequency of the tank circuit and at its own harmonic frequency as a resonated tank circuit causing a 180° phase shift in the radio frequency potential between the plate connection and the control grid. In this way feedback energy, both from the plate connection and from the lower end of the coil portion L2, is fed to the control grid in an accumulative manner and in the proper phase relation to provide regeneration or oscillation of the organization. It can thus be seen that a substantial feedback energy can be applied to the crystal to overcome its sluggishness in operating at its harmonic frequency.

On the other hand, at any other frequency than the selected harmonic frequency, the crystal CR ceases to have the high Q characteristic and becomes in effect nothing more than a simple condenser. Since the radio frequency voltage at the terminal of the plate is in phase opposition to the potential at the lower end of winding L2, the application of these two potentials through corresponding condeners act to neutralize each other and cause cessation of oscillation for any frequency other than the crystal frequency.

With such a characteristic, it is apparent that the exceedingly strong feedback provided for operation of the crystal cannot in any way overcome the natural vibration of the crystal and cause oscillation of the organization at a different and undesired frequency.

It should also be noted that the location of the crystal CR between the plate and the control grid has a natural tendency to cause oscillation on its fundamental mode, but since the feedback energy through the condenser C1 must of necessity be of the frequency at which the tank circuit is resonated, this characteristic of the crystal is entirely overcome, so that the organization is maintained in oscillation at the selected harmonic frequency of the crystal.

In the above description, it has been assumed that the crystal CR is operated in its harmonic mode, for which the circuit organization of the present invention is particularly well adapted; but it should be understood that the crystal CR may be a crystal operated at its fundamental frequency, if desired. If a crystal is to be operated at a very low fundamental frequency, it is apparent that the crystal will be relatively thick and thus tend to be rather sluggish. The present invention provides substantial feedback control so that even at these very low frequencies the organization is maintained in operation.

In all cases, the tank circuit including the windings L1—L2 and condenser C2 is tuned to the frequency at which the organization is to operate and corresponding to a particular selected frequency of the frequency spectrum of the control device. Since the tank circuit will not be tuned for any other frequency than the selected frequency of the control device, the organization as a whole cannot operate at any other than the selected frequency of the frequency spectrum of the control device. In this way, a very reliable and active oscillator organization has been provided.

Although the embodiment of the present invention is shown as specially adapted to control devices of the piezoelectric type, it is to be understood that other types of control devices may be employed such as the magnetostrictive type, for example, since the organization of the present invention is especially adapted to overcome the sluggishness of electro- or magneto-mechanical control devices.

Having thus described an oscillator organization as one specific embodiment of the present invention, it is desired to be understood that this form is selected to facilitate in the disclosure of the invention rather than to limit the number of forms which it may assume; and, it is to be further understood that various modifications, adaptations, and alterations may be applied to the specific form shown to meet the requirements of practice, without in any manner departing from the spirit or scope of the present invention.

What I claim is:

A radio frequency oscillation generator comprising in combination, an electron tube having cathode, anode and control grid elements, a piezo-electric crystal adapted to be operated at several harmonic frequencies of its fundamental vibration mode, a tank circuit having capacitive and inductive circuit elements tuned to a harmonic of said crystal, a variable balancing condenser, a direct curent voltage supply, a load circuit for said tube connecting said anode directly to said tank circuit and connecting an intermediate point on said induction element of said tank circuit through said voltage supply to said cathode, circuit means connecting said crystal directly between said one end of said tank circuit and said grid, circuit means for connecting said balancing condenser directly between the other end of said tank circuit and said grid, a grid leak resistor connected between said grid and said cathode, and a by-pass condenser shunting said voltage supply, whereby the adjustment of said balancing condenser to balance the grid to anode capacitance of the tube and of the crystal when the tank circuit is off resonance, neutralizes grid to cathode potential to prevent oscillations except for the harmonic frequency to which the tank circuit is tuned, thus permitting the use of a relatively thick and structurally sound crystal in determining the frequency for oscillation comparable to the fundamental resonance mode of a thin and fragile crystal.

JOHN C. O'BRIEN.

REFERENCES CITED

The following references are of record in the file of this patent:

UNITED STATES PATENTS

| Number | Name | Date |
|---|---|---|
| 2,066,027 | Braaten | Dec. 29, 1936 |
| 2,082,472 | Tunick | June 1, 1937 |
| 2,189,770 | Samuel | Feb. 13, 1940 |
| 2,256,932 | Wolfskill | Sept. 23, 1941 |
| 2,298,774 | Parker | Oct. 13, 1942 |
| 2,453,435 | Havstad | Nov. 9, 1948 |